(12) United States Patent
Jiang et al.

(10) Patent No.: US 12,244,850 B2
(45) Date of Patent: Mar. 4, 2025

(54) SUB-BLOCK MOTION PREDICTION METHOD, CODING METHOD, AND ENCODER

(71) Applicant: ZHEJIANG DAHUA TECHNOLOGY CO., LTD., Hangzhou (CN)

(72) Inventors: Dong Jiang, Hangzhou (CN); Jucai Lin, Hangzhou (CN); Jun Yin, Hangzhou (CN); Feiyang Zeng, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 429 days.

(21) Appl. No.: 17/695,842

(22) Filed: Mar. 16, 2022

(65) Prior Publication Data
US 2022/0210464 A1    Jun. 30, 2022

Related U.S. Application Data

(63) Continuation of application No. PCT/CN2020/116277, filed on Sep. 18, 2020.

(30) Foreign Application Priority Data

Sep. 18, 2019 (CN) .......................... 201910883008.X (51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/119* (2014.11);
(Continued)

(58) Field of Classification Search
CPC .... H04N 19/105; H04N 19/52; H04N 19/139; H04N 19/119; H04N 19/176; H04N 19/70
See application file for complete search history.

(56) References Cited

U.S. PATENT DOCUMENTS

| 2016/0191953 | A1  | 6/2016 | Wang et al. |
| 2016/0205398 | A1  | 7/2016 | Novotny |
| 2016/0219278 | A1* | 7/2016 | Chen ...................... H04N 19/52 |

FOREIGN PATENT DOCUMENTS

| CN | 104272743 A | 1/2015 |
| CN | 104811722 A | 7/2015 |

(Continued)

OTHER PUBLICATIONS

Jie Zhao et al: "Non-CE4: On SbTMVP base motion data derivation", 1 5. JVET Meeting; Jul. 3, 2019-Jul. 12, 2019; Gothenburg; (The Joint Video Exploration Team of ISO/IEC JTC1/SC29/WG11 and ITU-T SG.16 ), No. JVET-O0167 ;m48260 Jul. 3, 2019 (Jul. 3, 2019), pp. 1-4, XP030218751.

(Continued)

*Primary Examiner* — Tsion B Owens (57) ABSTRACT

A sub-block motion prediction method includes: obtaining a reference block, a co-located frame, and a reference frame of a current block; obtaining a motion vector of the current block, wherein the motion vector corresponds to a set of reference parameters; obtaining a co-located block of a sub-block based on the set of reference parameters, wherein a plurality of sub-blocks are obtained by dividing the current block; obtaining a candidate motion vector of each sub-block based on a motion vector of the co-located block; and obtaining a sub-block motion prediction result of the current block based on all candidate motion vectors of all sub-blocks and following a principle of consuming a minimal prediction cost.

18 Claims, 6 Drawing Sheets

(51) Int. Cl.
- *H04N 19/119* (2014.01)
- *H04N 19/139* (2014.01)
- *H04N 19/176* (2014.01)
- *H04N 19/70* (2014.01)

(52) U.S. Cl.
CPC ......... *H04N 19/139* (2014.11); *H04N 19/176* (2014.11); *H04N 19/70* (2014.11)

(56) References Cited

FOREIGN PATENT DOCUMENTS

| CN | 107534778 A | 1/2018 | | |
|---|---|---|---|---|
| CN | 108353166 A | 7/2018 | | |
| CN | 104272743 B | 1/2019 | | |
| CN | 110740317 A | 1/2020 | | |
| WO | WO-2019144930 A1 | * | 8/2019 | ........... H04N 19/105 |
| WO | WO2019147079 A1 | 8/2019 | | |

OTHER PUBLICATIONS

Bross B et al: "Versatile Video Coding (Draft 6)", 15. JVET Meeting; Jul. 3, 2019-Jul. 12, 2019; Gothenburg; (The Joint Video Exploration Team of ISO/IEC JTC1/SC29/WG11 AndITU-T SG.16 ), No. JVET-O2001-vE; JVET-O2001 Jul. 31, 2019(Jul. 31, 2019), pp. 1-455, XP030293944.

European Search Report,European Application No. 20864981.4 , mailed Sep. 12, 2022 (11 pages).

Chinese First Office Action, Chinese Application No. 201910883008. X, mailed May 28, 2021 (13 pages).

Notification to Grant Patent Right for Invention,Chinese Application No. 201910883008.X, mailed Sep. 15, 2021 (3 pages).

International search report and Written Opinion of the International Search Authority, International Application No. PCT/CN2020/116277, mailed Nov. 27, 2019 (9 pages).

Non-CE4: Simplification on SbTMVP.

Non-CE4: On SbTMVP base motion data derivation.

* cited by examiner

SUB-BLOCK MOTION PREDICTION METHOD, CODING METHOD, AND ENCODER

CROSS REFERENCE TO RELATED APPLICATIONS

The present application is a continuation-application of International (PCT) Patent Application No. PCT/CN2020/116277, filed on Sep. 18, 2020, which claims foreign priority of Chinese Patent Application No. 201910883008.X, filed on Sep. 18, 2019, in China National Intellectual Property Administration, the entire contents of which are hereby incorporated by reference in their entireties.

TECHNICAL FIELD

The present disclosure relates to the field of coding and decoding, and in particular to a sub-block motion prediction method, a coding method, and an encoder.

BACKGROUND

As a video may have a relatively large quantity of image data, pixel data of the video may be compressed to reduce data quantity of the video. Compressed data may be referred as a video stream. The video stream may be transmitted to a user terminal through a wired network or a wireless network, and may be decoded to be watched. In this way, a network bandwidth during transmission may be reduced, and a space for storing the video may be reduced.

A process of coding the video may include prediction, transformation, quantization, encoding, and so on. The prediction may include intra-frame prediction and inter-frame prediction. In a process of the inter-frame prediction, images may be compressed based on time-domain correlation between frames of images, such that a spatial redundancy and a temporal redundancy of video images may be eliminated. The process of the inter-frame prediction may be a process of obtaining motion vector (MV) information of a current coded block. The MV information may include an MV value, a prediction direction, and a reference frame. To provide a concise description, the MV information may be referred as an MV hereinafter. While performing a long-term study, the applicant has discovered that a mode of the inter-frame prediction in the art has certain limitations, and to some extent, accuracy of the inter-frame prediction may be affected.

SUMMARY

The present disclosure may provide a sub-block motion prediction method, a coding method, an encoder, and a non-transitory storage apparatus to improve the accuracy of prediction.

According to a first aspect of the present disclosure, a sub-block motion prediction method is provided and includes: obtaining one or more motion vectors of a current block, wherein each of the one or more motion vectors corresponds to a set of reference parameters, the set of reference parameters includes a co-located frame of the current block and a reference motion vector obtained from a motion vector of a reference block of the current block; obtaining a co-located block of each of a plurality of sub-blocks based on the set of reference parameters, wherein the co-located block of each of the plurality of sub-blocks is a block at which a first offset point of the co-located frame is located, the first offset point is a point formed by a specified point of each of the plurality of sub-blocks being offset for the reference motion vector; and obtaining a candidate motion vector of each of the plurality of sub-blocks based on a motion vector of the co-located block of each of the plurality of sub-blocks, and obtaining a sub-block motion prediction result of the current block based on all candidate motion vectors of all of the plurality of sub-blocks.

According to a second aspect of the present disclosure, a coding method is provided and includes: obtaining the sub-block motion prediction result of the current block at least by performing the above-mentioned sub-block motion prediction method; and coding the current block based on the sub-block motion prediction result of the current block.

According to a third aspect of the present disclosure, a sub-block motion prediction apparatus is provided and includes: a first obtaining module, a second obtaining module, a third obtaining module, and a fourth obtaining module. The first obtaining module is configured to obtain one or more motion vectors of a current block, wherein each of the one or more motion vectors corresponds to a set of reference parameters, the set of reference parameters comprises a co-located frame of the current block and a reference motion vector obtained from a motion vector of a reference block of the current block. The second obtaining module is configured to obtain a co-located block of each of a plurality of sub-blocks based on the set of reference parameters, wherein the co-located block of each of the plurality of sub-blocks is a block at which a first offset point of the co-located frame is located, the first offset point is a point formed by a specified point of each of the plurality of sub-blocks being offset for the reference motion vector. The third obtaining module is configured to obtain a candidate motion vector of each of the plurality of sub-blocks based on a motion vector of the co-located block of the plurality of sub-blocks. The fourth obtaining module is configured to obtain a sub-block motion prediction result of the current block based on all candidate motion vectors of all of the plurality of sub-blocks.

According to the present disclosure, a reference block, a co-located frame, and a reference frame, and at least one of the number of reference blocks, the number of co-located frames, and the number of reference frames may be greater than 1. In this way, an increased number of candidate motion vectors may be obtained, selection precision of a final prediction result may be improved, accuracy of the prediction may be improved, a temporal redundancy may further be eliminated, and a compression rate of inter-frame coding may be improved.

DETAILED DESCRIPTION

In order to illustrate the objective, technical solutions, and technical effects of the present disclosure more clearly, the present disclosure may be described in details by referring to accompanying drawings and embodiments.

Figure 1:
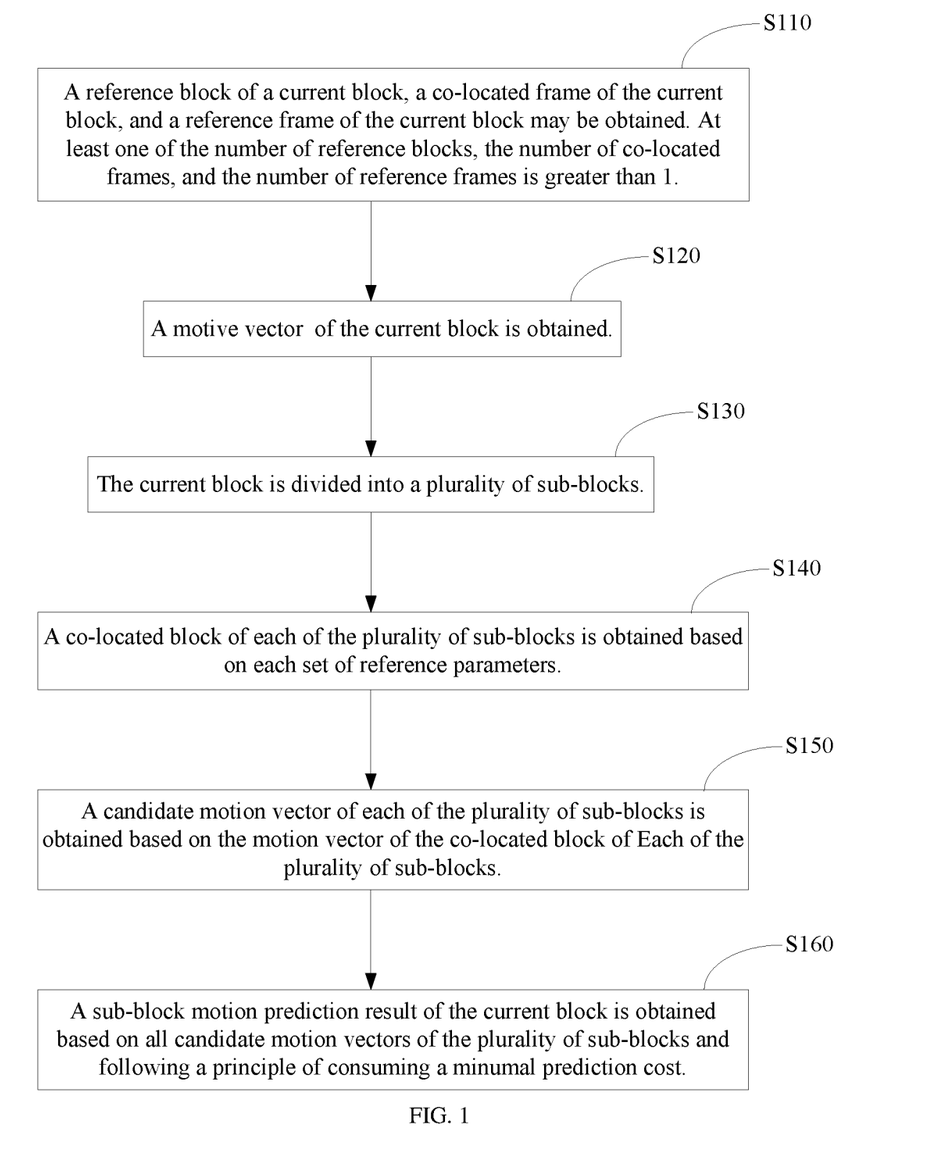
FIG. 1 is a flow chart of a sub-block motion prediction method according to an embodiment of the present disclosure.

As shown in FIG. 1, a flow chart of a sub-block motion prediction method according to an embodiment of the present disclosure is provided. It should be noted that, as long as a substantially identical result is achieved, a sequence of performing operations of the present embodiment may not be limited by FIG. 1. In the present embodiment, the sub-block motion prediction method may include following operations.

In an operation S110, a reference block of a current block, a co-located frame of the current block, and a reference frame of the current block may be obtained. At least one of the number of reference blocks, the number of co-located frames, and the number of reference frames is greater than 1.

The current block may be referred as a current coding block or a current coding unit. Based on similarity between spatial domain blocks, a coded block on a coded side of the current block in a current frame may be selected as the reference block of the current block, and one or more reference blocks may be selected. Following a coding order, the coded side may include a left side and an upper side. A coded block adjacent to the current block may be selected with priority to be the reference block.

The co-located frame may be configured to locate a co-located block, and one or more co-located frames may be obtained. The co-located frame may be the same as, or different from, the reference frame.

Figure 2:
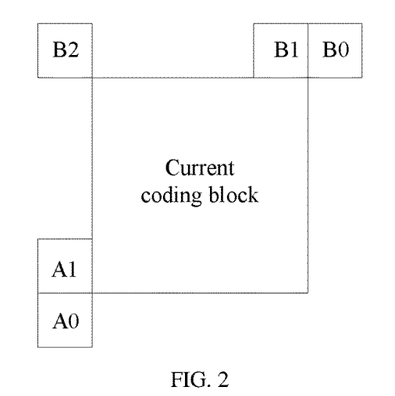
FIG. 2 is a schematic view showing a positional relationship between a sub-block and a reference block according to an embodiment of the present disclosure.

As shown in FIG. 2, a positional relationship between the current block and the reference block according to an embodiment of the present disclosure is shown. One or more of blocks located at A0, A1, B0, B1, and B2 may be selected as reference blocks of the current block, a sequence of selection and the number of selected blocks may not be limited herein. When two or more blocks are selected to be the reference blocks, MVs of the selected reference blocks may be different from each other.

In one embodiment, the co-located frame and the reference frame of the current block may be selected from a reference frame list of the current block. A location of the co-located frame in the reference frame list, a location of the reference frame in the reference frame list, the number of co-located frames in the reference frame list, and the number of reference frames in the reference frame list may not be limited herein. That is, a frame at any location in the reference frame list, and any number of frames in the reference frame list may be selected to be the co-located frame and the reference frame. The reference frame list may include a list 0 and a list 1. A forward reference frame of the current frame may be stored in the list 0 first, and a backward reference frame of the current frame may be stored in the list 0 subsequently. The backward reference frame of the current frame may be stored in the list 1 first, and the forward reference frame of the current frame may be stored in the list 1 subsequently. Alternatively, when the co-located frame and the reference frame are selected simultaneously, they must be selected from a same list, especially for the P frame.

In an operation S120, a motion vector of the current block is obtained.

The number of motion vectors may be greater than or equal to 1. The motion vector of each current block may correspond to a set of reference parameters. Each set of reference parameters may include a reference motion vector, the co-located frame, and the reference frame, which are obtained based on a motion vector of the reference block.

Figure 3:
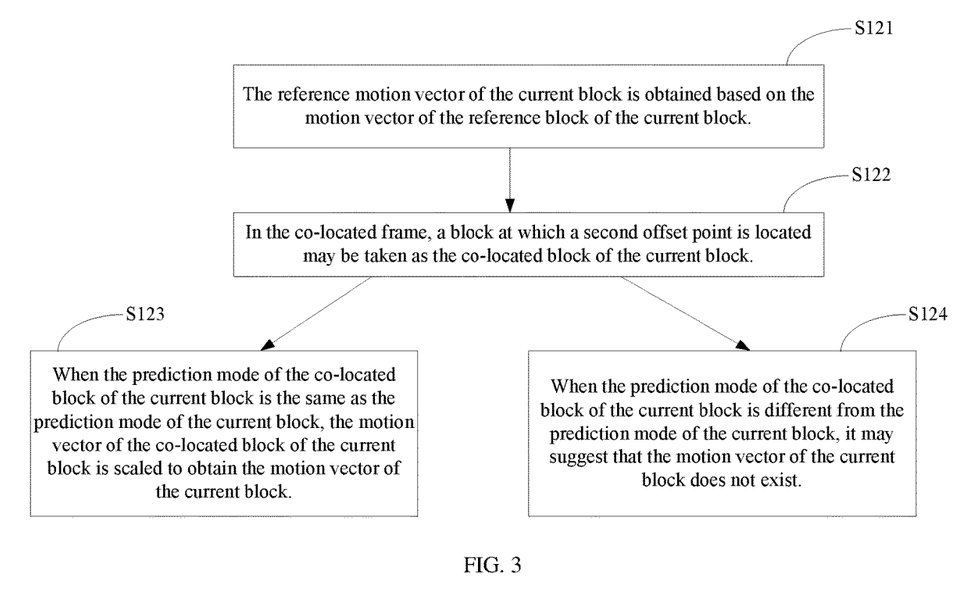
FIG. 3 is a flow chart of performing the operation S120 in FIG. 1.

As shown in FIG. 3, it should be noted, as long as a substantially identical result can be achieved, a sequence of performing operations of the present embodiment may not be limited by FIG. 3. In one embodiment, the operation S120 may include following operations.

In an operation S121, a reference motion vector of the current block is obtained based on the motion vector of the reference block of the current block.

When a prediction mode applied by the reference block of the current block is the same as a prediction mode applied by the current block, the motion vector of the reference block of the current block may be taken as the reference motion vector of the current block. When the prediction mode of the reference block of the current block is different from the prediction mode of the current block, the reference motion vector of the current block may be recorded as 0. The present embodiment does not require the forward or the backward reference frame of the current block and the co-located frame of the current frame to be a same frame. All reference blocks may be traversed, and a plurality of reference motion vectors may be obtained. When the plurality of reference motion vectors include a repeated motion vector, i.e., a same motion vector occurring twice or more, the repeated motion vector may eliminated.

The prediction mode of the current block may be an inter-frame prediction mode. The inter-frame prediction mode may include a conventional advanced motion vector prediction (AMVP) mode, a conventional Merge mode, a triangular mode, a HASH mode, and an affine mode. In these modes, various prediction means may be performed to obtain a final predicted value based on correlation between frames. In one embodiment, the prediction mode of the current block is the inter-frame prediction mode. When a prediction mode of the reference block is the inter-frame prediction mode, the reference motion vector of the current block may be the motion vector of the reference block. When the reference block is a non-inter-frame block, the reference motion vector of the current block may be recorded as 0.

For example, in one embodiment, the prediction mode of the current block is the inter-frame prediction mode. As shown in FIG. 2, one or more of the blocks located at A0, A1, B0, B1, and B2 may be selected to be the reference blocks of the current block. When the blocks located at A1, B1, and B2 are inter-frame blocks, and MV information of the block at B1 is the same as MV information of the block at B2, but is different from MV information of the block at A1, the MV information of the blocks at A1 and B1 may be selected to be MV information of the reference block. Correspondingly, the reference MV of the current block may be the MVs of the reference block A1 and the reference block B1.

In an operation S122, in the co-located frame, a block at which a second offset point is located may be taken as the co-located block of the current block.

The second offset point may be a point formed by a specified point in the current block being offset for the reference motion vector. The specified point in the current block may be a central point of the current block. Alternatively, the specified point may be a point at other positions of the current block, such as a point at which a pixel at an upper-left corner is located.

In an operation S123, when a prediction mode of the co-located block of the current block is the same as the prediction mode of the current block, a motion vector of the co-located block of the current block may be scaled to obtain the motion vector of the current block.

A formula for scaling may be shown as: cur MV=(td/tb) *colMV. The curMV represents the MV of the current block, the colMV represents the MV of the co-located block of the current block, the td represents a temporal distance between the co-located frame at which the co-located block is located and a reference image/the reference frame of the co-located frame (a POC difference value), and the tb represents a temporal distance between the current frame and a reference image/the reference frame of the current frame (the POC difference value).

In an operation S124, when the prediction mode applied by the co-located block of the current block is different from the prediction mode applied by the current block, it may suggest that the MV of the current block does not exist. In this situation, a prediction process of the sub-block motion mode may not be performed.

A combination of one reference motion vector and one co-located frame may determine one co-located block. To determine a plurality of co-located blocks, the operations S123/S124 may be performed for a plurality of times. When a prediction mode applied by one of the plurality of co-located blocks is the same as the prediction mode applied by the current block, various reference frames may be considered in combination to obtain various motion vectors of the current block. When a prediction mode applied by one of the plurality of co-located blocks is different from the prediction mode of the current block, it may suggest that the motion vector of the current block does not exist, and the reference frame may not be considered in combination any more. All combinations of the reference motion vector, the co-located frame, and the reference frame may be traversed to obtain at least one motion vector of the current block, and corresponding reference parameters may be recorded.

Continue from the above example, which takes the MVs of the reference block A1 and the reference block B1 as the reference MV of the current block, various processes of obtaining the MV of the current block in various situations may be illustrated hereinafter.

As shown in FIG. 2, in one embodiment, the current frame is P frame, POC=4, and the reference frame list 0, L0={0, 8, 16}. The co-located frame and the reference frame are selected from the L0. A motion vector of the reference block A1 may be MV1, and a motion vector of the reference block B1 may be MV2. The central point of the current block may be the specified point, and coordinates of the specified point are (x, y). All co-located frames and all reference frames may be traversed based on the MVs of the reference block A1 and the reference block B1, and candidate motion vectors of the current block may be obtained.

When the block A1 is taken as the reference block, all frames in the list L0 may be selected to be co-located frames. All co-located frames may be traversed, an effective co-located frame may be selected, and an MV of a co-located frame in the effective co-located frame may be obtained. When a prediction mode of the co-located block is the same as the prediction mode of the current block, a co-located frame at which the co-located block is located may be the effective co-located frame.

When the POC of the co-located frame is 0, the frame may be an I frame (an intra-frame coding frame) and does not have a reference frame. That is, the prediction mode of the co-located block is different from the prediction mode of the current block. Therefore, when the frame is taken as the co-located frame, the MV of the current block does not exist, and the prediction process of the sub-block motion mode may not be performed in this situation.

When the POC of the co-located frame is 8, and when a prediction mode of a co-located block in the co-located frame, which has a point formed by the central point of the current block being offset for MV1, is the inter-frame mode, and that is, the prediction mode of the co-located block is the same as the prediction mode of the current block, the frame having the POC of 8 may be taken as the co-located frame, and the MV of the current block exists. The co-located frame may be the effective co-located frame, and the MV of the co-located block in the effective co-located frame may be obtained.

When the POC of the co-located frame is 16, and when a prediction mode of a co-located block in an co-located frame, which has a point formed by the central point of the current block being offset for MV1, is not the inter-frame mode, and that is, the prediction mode of the co-located block is different from the prediction mode of the current block, the frame having the POC of 16 is taken as the co-located frame, the MV of the current block does not exist, and the prediction process of the sub-block motion mode may not be performed in this situation. In summary, the POC of the effective co-located frame is 8, when the block A1 is selected as the reference block.

All frames in the list L0 may be selected to be the reference frames. All reference frames in the list L0 may be traversed, the formula, the MV of the co-located block in the effective co-located frame may be scaled by using the formula, curMV=(td/tb)*colMV, and 3 candidate MVs of the current block may be obtained.

When the reference block is the block B1, all co-located frames may be traversed in a same manner as mentioned above. When POCs of the effective co-located frame selected from the block B1 are 8 and 16, all reference frames in the list L0 may be traversed, the MV of the co-located block in the effective co-located frame may be scaled, and 6 candidate MVs of the current block may be obtained. In this way, 9 candidate MVs of the current block may be obtained, 3 of them are obtained when the block A1 is the reference block, and 6 of them are obtained when the block B1 is the reference block.

As shown in FIG. 2, in another embodiment, the current frame may be a B frame, POC=4, the reference frame list L0={0, 8, 16}, and the reference frame list L1={8, 16, 0}. The co-located frames and the reference frames may be selected from the lists L0 and L1. Motion vectors of the reference block A1 are {MV1, MV2}, and motion vectors of the reference block B1 are {MV3, MV4}. The specified point may be the central point of the current block, and coordinates of the specified point are (x, y). All co-located frames and all reference frames may be traversed based on the motion vectors of the block A1 and the block B1, and candidate motion vectors of the current block may be obtained.

When the reference block is the block A1, the forward motion vector MV1 may select {0, 8} from the list L0 to be the co-located frames, and the backward motion vector MV2 may select {8, 16} from the list L1 to be the co-located frames. All co-located frames may be traversed, an effective co-located frame may be selected, and the MV of the co-located block in the effective co-located frame may be obtained.

When the POC of the co-located frame of the forward motion vector is 0, the frame may be the I frame and does not have a reference frame. That is, the prediction mode of the co-located block is different from the prediction mode of the current block. Therefore, when the frame having the POC of 0 is taken as the co-located frame, the MV of the current block does not exist, and the prediction process of the sub-block motion mode may not be performed in this situation.

When the POC of the forward motion vector and the POC of the backward motion vector are 8, and when a prediction mode of a co-located block in an co-located frame, which has a point formed by the central point of the current block being offset for MV1, is the inter-frame mode, and a prediction mode of a co-located block in an co-located frame, which has a point formed by the central point of the current block being offset for MV2, is not the inter-frame mode, the prediction mode of the co-located block may be considered to be different from the prediction mode of the current block. Therefore, when the frame having the POC of 8 is taken as the co-located frame, the MV of the current block does not exist, and the prediction process of the sub-block motion mode may not be performed in this situation.

When the POC of the forward motion vector is 8, and the POC of the backward motion vector is 16, and when the prediction mode of the co-located block in the co-located frame, which has the point formed by the central point of the current block being offset for MV1, is the inter-frame mode, and the prediction mode of the co-located block in the co-located frame, which has the point formed by the central point of the current block being offset for MV2, is the inter-frame mode, the prediction mode of the co-located block may be the same as the prediction mode of the current block. Therefore, when the frames having the POC of 8 and 16 are taken as the co-located frames, the MV of the current block exists, the co-located frames may be effective co-located frames, and the MV of the co-located block of the effective co-located frames may be obtained. In summary, when the block A1 is selected to be the reference block, the POC corresponding to the effective co-located frame of the forward motion vector is 8, and the POC corresponding to the effective co-located frame of the backward motion vector is 16.

The forward motion vector may select all frames in the list L0 to be forward reference frames of the current frame. The backward motion vector may select all frames in the list L1 to be backward reference frames of the current frame. All reference frames may be traversed, and the MV of the co-located block in the effective co-located frame may be scaled by using the formula, curMV=(td/tb)*colMV. When the reference block is the block A1, 4 candidate MVs of the current block may be obtained.

When the reference block is the block B1, all co-located frames may be traversed in a same manner. When the POC corresponding to the effective co-located frame of the forward motion vector is 8, and the POC corresponding to the effective co-located frame of the backward motion vector is 8, all reference frames may be traversed. The MV of the co-located block in the effective co-located frame may be scaled, and 4 candidate MVs of the current block may be obtained. In summary, 8 candidate MVs of the current block may be obtained, 4 of them are obtained when the reference block is the block A1, and 4 of them are obtained when the reference block is the block B1.

In an operation S130, the current block is divided into a plurality of sub-blocks.

The current block is divided into a plurality of sub-blocks, and the plurality of sub-blocks may be in different sizes or in a same size. The plurality of sub-blocks may not overlap with each other. All of the plurality of sub-blocks may be rectangular. Alternatively, at least some of the plurality of sub-blocks may be irregularly shaped. A means of dividing the current block may be determined based on parameters of the current block, such as based on a size of the current block. After the means of dividing the current block is determined, the same means may be applied to various motion vectors.

When determining the means of dividing the current block does not consider the motion vector of the current block, the instant operation may be performed before the operation S140. A sequence of performing operations S110, S120, and the instant operation may be exemplary, and may be interchangeable. Alternatively, the operations S110, S120, and the instant operation may be performed simultaneously.

In one embodiment, when the current block is divided into the plurality of sub-blocks, sizes of the plurality of sub-blocks may be determined based on a comparison result of an amplitude value of the motion vector of the current block to a predefined threshold. The current block may be divided based on the sizes of the sub-blocks. For example, the MV of the current block is (x, y), and the amplitude value of the motion vector is $\sqrt{x^2+y^2}$. When the current frame is a unidirectional predicted frame, an amplitude value of a corresponding motion vector may be calculated. When the current frame is a bidirectional predicted frame, each motion vector may include two directional motion vectors, an amplitude value of each of the two directional motion vectors may be calculated, obtaining two amplitude values. The two amplitude values may be added to obtain the amplitude value of the motion vector.

When the amplitude value of the motion vector of the current block is less than the predefined threshold, a width of each of the plurality of sub-blocks may be a lower value selected from a first predefined value and a width of the current block, and a height of each of the plurality of sub-blocks may be a lower value selected from a second predefined value and a height of the current block. When the amplitude value of the motion vector of the current block is greater than or equal to the predefined threshold, the width of each of the plurality of sub-blocks may be a lower value selected from a third predefined value and the width of the current block, and the height of each of the plurality of sub-blocks may be a lower value selected from a fourth predefined value and the height of the current block.

For example, a size of one of the plurality of sub-blocks is M*N. the amplitude value of the MV of the current block is less than a threshold T, the first predefined value is 8, and the second predefined value is 8. When the width of the current block is less than 8, M may be equal to the width of the current block. When the width of the current block is not less than 8, M may be equal to 8. When the height of the current block is less than 8, N may be the height of the current block. When the height of the current block is not less than 8, N may be equal to 8. In another example, the amplitude value of the MV of the current block is greater than or equal to the threshold T, the third predefined value is 16, and the fourth predefined value is 16. When the width of the current block is less than 16, M may be equal to the width of the current block. When the width of the current block is not less than 16, M may be equal to 16. When the height of the current block is less than 16, N may be equal to the height of the current block. When the height of the current block is not less than 16, N may be equal to 16. The threshold T>0.

In one embodiment, the current frame is a P frame (a forward predicted frame, a forward P frame and a forward I frame of the current frame may be taken as the reference frames). A size of the current block is 32×32, the amplitude value of the motion vector of the reference block is MV, the threshold T=32. When MV<32, a size of each of the plurality of sub-blocks of the current block is 8×8. When MV>=32, the size of each of the plurality of sub-blocks of the current block is 16×16.

In another embodiment, the current frame is a B frame (a bidirectional predicted frame, a forward P frame, a forward I frame, and a backward P frame of the current frame may be taken as the reference frames). A size of the current block is 32×8, the amplitude value of a forward motion vector of the reference block is MV1, and the amplitude value of a backward motion vector of the reference block is MV2, and the threshold T=64. When (MV1+MV2)<64, the size of each of the plurality of sub-blocks of the current block is 8×8. When (MV1+MV2)>=64, the size of each of the plurality of sub-blocks of the current block is 16×8.

In the present implementation, the number of means for selecting the sizes of the sub-blocks in increased. Dividing the current block into the plurality of sub-blocks may be performed in a more flexible manner, adapted for various levels of calculation complexity. Correspondingly, various prediction schemes may be obtained, improving accuracy of prediction.

In an operation S140, a co-located block of each of the plurality of sub-blocks is obtained based on each set of reference parameters.

The plurality of sub-blocks are obtained by dividing the current block as described in the operation S130.

The co-located block of each of the plurality of sub-blocks is a block at which the first offset point of the co-located frame is located, and the first offset point is a point formed by a specified point of each of the plurality of sub-blocks being offset for a reference motion vector. The specified point of each of the plurality of sub-blocks may be a central point of a sub-block or a point at other positions of the sub-block, such as a point at which an upper-left pixel is located.

A means to obtain the co-located block of each of the plurality of sub-blocks may be similar to the means to obtain the co-located block of the current block as described in the above embodiments. By contrast, all possible combinations of the reference motion vector and the co-located frame are traversed while obtaining the co-located block of the current block, whereas all reference parameters are required to be traversed only while obtaining the co-located block of each of the plurality of sub-blocks.

The specified point of the sub-block may be different from the specified point of the current block, and the means of dividing the current block may affect sizes of the sub-blocks. Therefore, even when a same set of reference parameters are applied, the co-located block of each of the plurality of sub-blocks may not be the same as the co-located block of the current block.

In an operation S150, a candidate motion vector of each of the plurality of sub-blocks may be obtained based on a motion vector of the co-located block of each of the plurality of sub-blocks.

When a prediction mode applied by the co-located block of each of the plurality of sub-blocks is the same as the prediction mode applied by the current block (i.e., a prediction mode applied by the sub-blocks), the motion vector of the co-located block of each of the plurality of sub-blocks may be scaled to obtain the candidate motion vector of each of the plurality of sub-blocks. A formula for scaling in the instant operation may be the same as the formula for scaling to obtain the motion vector of the current block. When the prediction mode applied by the co-located block of each of the plurality of sub-blocks is different from the prediction mode applied by the current block, the motion vector of the current block may be taken as a candidate motion vector of each of the plurality of sub-blocks.

The operations S140 to S150 may be performed to each of the plurality of sub-blocks, and the candidate motion vector of each of the plurality of sub-blocks may be obtained based on each set of reference parameters.

Based on the first embodiment, which obtains the MV of the current block, various processes of obtaining motion vectors of the plurality of sub-blocks in various situations will be illustrated hereinafter by referring to examples.

In an example, the reference block is the block A1, and the POCs of the co-located frame are 0 and 16, the MV of the current block may not exist. The prediction process of the sub-block motion mode may not be performed in this situation. While obtaining the co-located block of each of the plurality of sub-blocks, the co-located frames may not be traversed. That is, while obtaining the co-located block of each of the plurality of sub-blocks, only the effective co-located frame is required to be traversed.

In one embodiment, while obtaining an MV of a sub-block, a combination of the co-located frame and the reference frame, which has been determined for the MV of the current block, may be applied. For example, when the reference block is the block A1, 3 MVs of the current block may be obtained. That is, 3 combinations of the co-located frame and the reference frame may be obtained. When the reference block is the block B1, 6 MVs of the current block may be obtained. That is, 6 combinations of the co-located frame and the reference frame may be obtained. In summary, 9 combinations of the co-located frame and the reference frame are obtained for the current block. While obtaining the MV of the sub-block, the 9 combinations of the co-located frame and the reference frame may be traversed directly, and the co-located frames and the reference frames may not be traversed respectively. When the MV of the sub-block does not exist for a certain combination of the co-located frame and the reference frame, the MV of the current block corresponding to the certain combination of the co-located frame and the reference frame may be taken as the MV of the sub-block.

In another embodiment, while obtaining the MV of the sub-block, the operation of obtaining the MV of the current block may be performed. The effective co-located frames may be traversed first to determine whether the MV of the sub-block exists. When the MV of the sub-block exists, the MV of the co-located block of the sub-block may be obtained. Further, the reference frames may be traversed, and the MV of the sub-block may be obtained. When the MV of the sub-block does not exist, any MV of the current block may be taken as the MV of the sub-block.

When dividing the current block into the plurality of sub-blocks by a certain means, after the combination of the co-located frame and the reference frame is determined, the same combination of the co-located frame and the reference frame may be applied to all of the plurality of sub-blocks for obtaining the candidate MVs. In this way, traversing and obtaining the combination of the co-located frame and the reference frame may not be performed for each of the plurality of sub-blocks.

In an operation S160, a sub-block motion prediction result of the current block may be obtained based on all candidate motion vectors of the sub-blocks and following a principle of consuming a minimal prediction cost.

Figure 4:
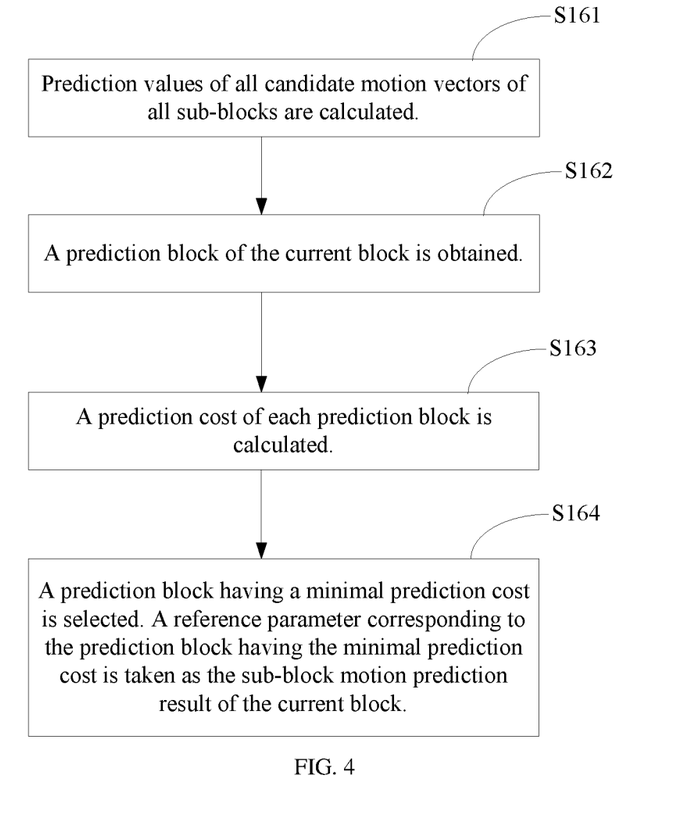
FIG. 4 is a flow chart of performing the operation S160 in FIG. 1.

As shown in FIG. 4, it should be noted that, as long as a substantially identical result can be achieved, a sequence of performing operations of the present embodiment is not limited by FIG. 4. In one embodiment, the operation S160 may include following operations.

In an operation S161, prediction values of all candidate motion vectors of all sub-blocks may be calculated.

In order to reduce a calculation quantity, a plurality of consecutive sub-blocks, which have a same candidate motion vector, may be treated as integrity, and a prediction value of the integrity may be calculated. Alternatively, in order to avoid an irregular-shaped block, the prediction operation may be performed to the sub-blocks row by row, and the consecutive sub-blocks to be treated as integrity may be located in one row. Alternatively, the prediction operation may be performed to the sub-blocks column by column, and the consecutive sub-blocks to be treated as integrity may be located in one column.

In an operation S162, a prediction block of the current block may be obtained.

The number of prediction blocks may be greater than or equal to one, and may be equal to the number of the reference parameters. Each prediction block may be composed of the prediction values of all sub-blocks, wherein the prediction values are obtained by performing the prediction operation based on the candidate motion vectors of all sub-blocks, and the candidate motion vectors of all sub-blocks are obtained based on a same set of reference parameters.

In an operation S163, a prediction cost of each prediction block may be calculated.

The prediction cost may be a rate distortion cost or other types of cost.

In an operation S164, a prediction block having a minimal prediction cost may be selected. A reference parameter corresponding to the prediction block having the minimal prediction cost may be taken as the sub-block motion prediction result of the current block.

Subsequently, the current block may be coded to obtain a stream of the current block based on the sub-block motion prediction result of the current block. The stream of the current block may include a sub-block motion syntax element. The sub-block motion syntax element may be configured to indicate whether the sub-block motion prediction method should be applied for coding. In other embodiments, when a decoding capability permits, a coding terminal is not required to transmit other syntax elements, and a same sub-block motion prediction process may be performed in a decoding terminal.

In one embodiment, the stream of the current block may further include at least one of a reference block syntax element, a co-located frame index syntax element, and a reference frame index syntax element. The reference block syntax element may be configured to indicate a location of a reference block corresponding to the sub-block motion prediction result of the current block. The co-located frame index syntax element may be configured to indicate an index of the co-located frame in the reference frame list, wherein the co-located frame corresponds to the sub-block motion prediction result of the current block. The reference frame index syntax element may be configured to indicate an index of the reference frame in the reference frame list, wherein the reference frame corresponds to the sub-block motion prediction result of the current block.

In one embodiment, an smType syntax element may be applied to express the sub-block motion mode. In a coding terminal, an index0 syntax element may be configured to indicate a location of the reference block of the sub-block, an index1 syntax element may be configured to indicate a location of the co-located frame in the list0, an index2 syntax element may be configured to indicate a location of the co-located frame in the list1, an index3 syntax element may be configured to indicate a location of the reference frame in the list0, an index4 syntax element may be configured to indicate a location of the reference frame in the list1, and an index5 syntax element may be configured to indicate a direction of the co-located frame and a direction of the reference frame.

In another embodiment, various prediction values of the candidate motion vectors may be applied to various sub-blocks and may be combined in various manners. Prediction costs of all candidate motion vectors of all sub-blocks may be calculated. A candidate motion vector having the minimal prediction cost for each sub-block may be selected and taken as a final motion vector of each sub-block. Final motion vectors of all sub-blocks may be taken as the sub-block motion prediction result of the current block. In the present embodiment, when the combination of the co-located frame and the reference frame of each sub-block is traversed and obtained, and when the syntax element is expressing, locations of the reference blocks corresponding to all sub-blocks, locations of the co-located frames corresponding to all sub-blocks in the list0, locations of the co-located frames corresponding to all sub-blocks in the list1, locations of the reference frames corresponding to all sub-blocks in the list0, and locations of the reference frames corresponding to all sub-blocks in the list1 may be expressed.

According to the present embodiment, at least one of the number of reference blocks, the number of co-located frames, and the number of reference frames may be greater than one. In this way, an increased number of sub-block candidate motion vectors may be obtained, precision of selecting the final motion vector may be improved, accuracy of prediction may be improved, the temporal redundancy may be eliminated, and a compression rate of inter-frame coding may be improved.

Figure 5:
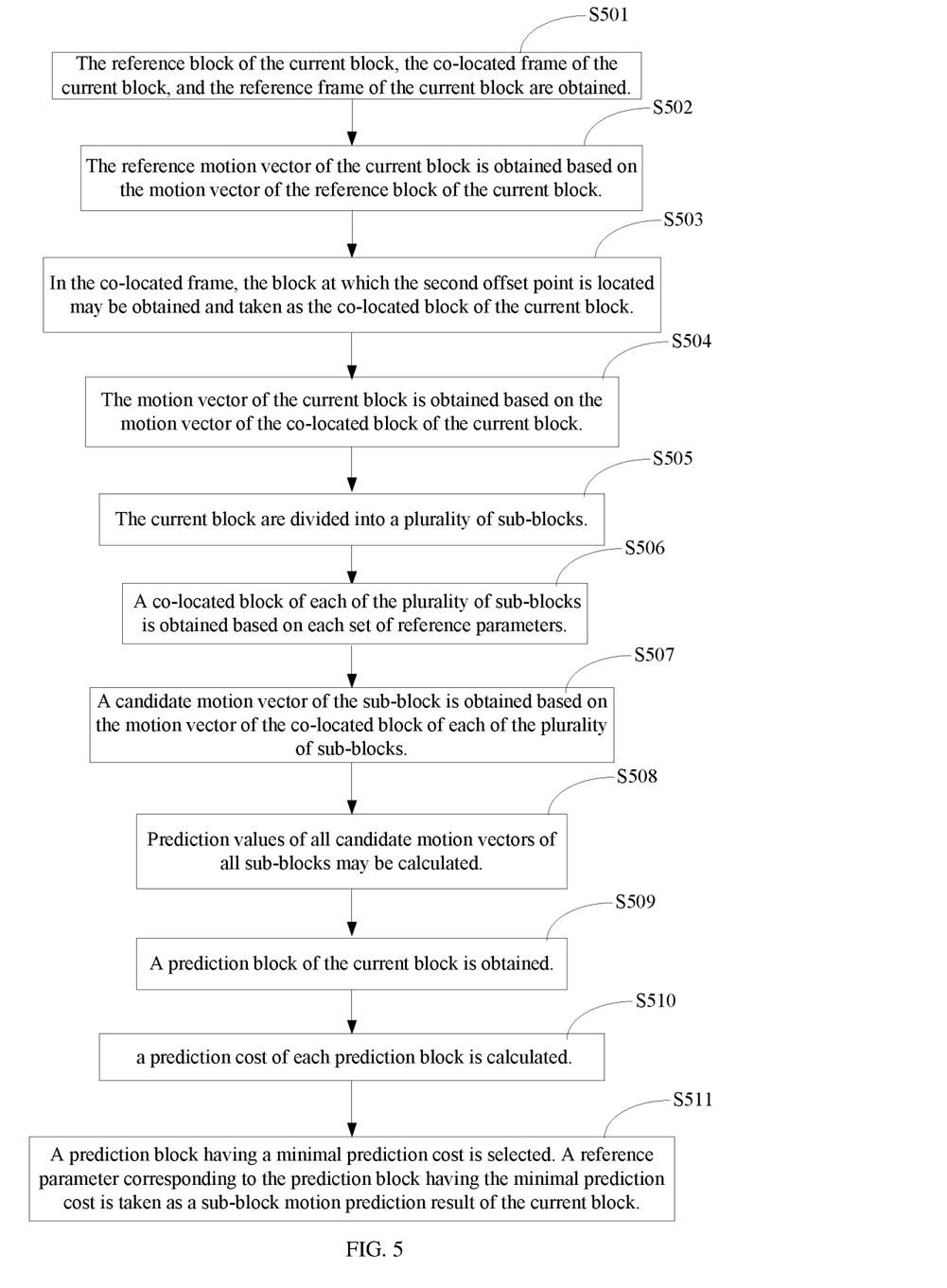
FIG. 5 is a flow chart of a sub-block motion prediction method according to an embodiment of the present disclosure.

As shown in FIG. 5, a flow chart of a sub-block motion prediction method according to an embodiment of the present disclosure is provided. The present embodiment may illustrate the sub-block motion prediction method in more details. Some operations in the present embodiment may be identical to those in the above embodiments, and will not be repeatedly described hereinafter. It should be noted that, as long as a substantially identical results can be achieved, a sequence of performing operations of the present embodiment may not be limited by FIG. 5. As shown in FIG. 5, the present embodiment may include following operations.

In an operation S501, the reference block, the co-located frame, and the reference frame of the current block may be obtained.

At least one of the number of reference blocks, the number of co-located frames, and the number of reference frames may be greater than one.

In an operation S502, the reference motion vector of the current block may be obtained based on the motion vector of the reference block of the current block.

When the prediction mode of the reference block of the current block is the same as the prediction mode of the current block, the motion vector of the reference block of the current block may be taken as the reference motion vector of the current block. When the prediction mode of the reference block of the current block is different from the prediction mode of the current block, the reference motion vector of the current block may be recorded as 0.

In an operation S503, in the co-located frame, the block at which the second offset point is located may be obtained and taken as the co-located block of the current block.

The second offset point may be a point formed by the specified point in the current block being offset for the motion vector.

In an operation S504, the motion vector of the current block may be obtained based on the motion vector of the co-located block of the current block.

When the prediction mode applied by the co-located block of the current block is the same as the prediction mode applied by the current block, the motion vector of the co-located block of the current block may be scaled to obtain the motion vector of the current block.

When the prediction mode applied by the co-located block of the current block is different from the prediction mode applied by the current block, the MV of the current block may not exist, and the prediction process of the sub-block motion mode may not be performed in this situation.

When the number of motion vectors of the current block is greater than or equal to one, each motion vector of the current block may correspond to a set of reference parameters. Each set of reference parameters may include the reference motion vector, the co-located frame, and the reference frame, which are obtained based on the motion vector of the reference block.

When the MV of the current block exists, the prediction process of the sub-block motion mode may be performed.

In an operation S505, the current block may be divided into a plurality of sub-blocks.

A size of a sub-block may be determined based on a comparison result of an amplitude value of the motion vector of the current block to a predefined threshold. The current block may be divided based on the size of the sub-block.

In an operation S506, a co-located block of each of the plurality of sub-blocks may be obtained based on each set of reference parameters.

The co-located block of each of the plurality of sub-blocks may be a block at which a first offset point of the co-located frame is located, and the first offset point is a point formed by a specified point of each of the plurality of sub-blocks being offset for the reference motion vector.

A means of obtaining the co-located block of each of the plurality of sub-blocks may be similar to the means of obtaining the co-located block of the current block as described in the above. By contrast, the process of obtaining the co-located block of each of the plurality of sub-blocks only requires all reference parameters to be traversed.

In an operation S507, a candidate motion vector of each of the plurality of sub-blocks may be obtained based on the motion vector of the co-located block of each of the plurality of sub-blocks.

When the prediction mode applied by the co-located block of each of the plurality of sub-blocks is the same as the prediction mode applied by the current block (i.e., the prediction mode applied by each of the plurality of sub-blocks), the motion vector of the co-located block of each of the plurality of sub-blocks may be scaled to obtain the candidate motion vector of the each of the plurality of sub-blocks. When the prediction mode applied by the co-located block of each of the plurality of sub-blocks is different from the prediction mode applied by the current block, the motion vector of the current block may be taken as the candidate motion vector of each of the plurality of sub-blocks.

By performing a sub-block division means, after a combination of the co-located frame and the reference frame is determined, the candidate MV of each of the plurality of sub-blocks may be obtained based on a same combination of the co-located frame and the reference frame. Obtaining the combination of the co-located frame and the reference frame may not be achieved by traversing each of the plurality of sub-blocks.

In an operation S508, prediction values of all candidate motion vectors of all sub-blocks may be calculated.

In an operation S509, a prediction block of the current block may be obtained.

The number of prediction blocks may be greater than or equal to one, and may be equal to the number of reference parameters. Each prediction block may be composed of the prediction values of all sub-blocks, wherein the prediction values are obtained by performing the prediction operation based on the candidate motion vectors of all sub-blocks, and the candidate motion vectors of all sub-blocks are obtained based on a same set of reference parameters.

In an operation S510, a prediction cost of each prediction block may be calculated.

In an operation S511, a prediction block having a minimal prediction cost may be selected. A reference parameter corresponding to the prediction block having the minimal prediction cost may be taken as a sub-block motion prediction result of the current block.

The current block may be coded based on the sub-block motion prediction result of the current block to obtain a stream of the current block. The stream of the current block may include a sub-block motion syntax element, and the sub-block motion syntax element may be configured to suggest whether the sub-block motion prediction method is performed for coding.

In an embodiment, the sub-block motion prediction method may be taken as an independent prediction mode to predict the current block. In other embodiments, the sub-block motion prediction method may be applied in all MV-based prediction modes, such as a Merge affine inter-frame mode, an advanced motion vector prediction (AMVP) mode, and so on.

Applying the sub-block motion prediction method in the Merge affine inter-frame mode may be taken as an example for illustration hereinafter. In the affine Merge mode, the current block may be divided into a plurality of sub-blocks. An MV candidate list may be constructed. A sequence of filling various types of MVs into the candidate list may be: a sub-block MV, a spatial domain MV (an evolved MV of a spatial reference block formed by affine model transformation), a temporal-spatial domain MV (an MV formed by combining the spatial domain and the temporal domain), and 0MV. A final MV of the current block may be selected from the MV candidate list. The sub-block MV may be obtained by performing the above-mentioned sub-block motion prediction method.

When the sub-block motion prediction method is applied to the MV-based prediction mode, the MV candidate list may be constructed, and the final MV having the minimal prediction cost may be selected from the MV candidate list. The current block may be divided into a plurality of sub-blocks, and the sub-block motion prediction method may be performed for obtaining the final MV. A prediction cost of the final MV selected from the MV candidate list may further be compared to the prediction cost based on the sub-block motion mode, and a prediction mode having a lower prediction cost may be applied for the prediction operation to obtain the prediction value.

Figure 6:
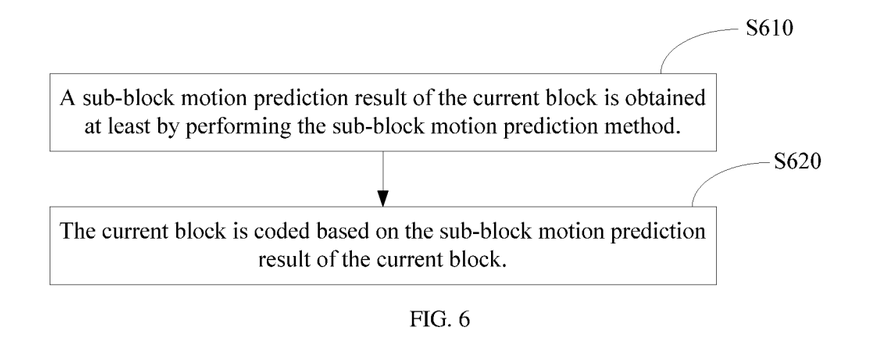
FIG. 6 is a flow chart of an encoding method according to an embodiment of the present disclosure.

As shown in FIG. 6, a flow chart of an encoding method according to an embodiment of the present disclosure is provided. It should be noted that, as long as a substantially identical result can be achieved, a sequence of performing the present embodiment may not be limited by FIG. 6. The method may be executed by an encoder. In the present embodiment, the coding method may include following operations.

In an operation S610, a sub-block motion prediction result of the current block is obtained at least by performing the sub-block motion prediction method.

The sub-block motion prediction result may be obtained by performing the sub-block motion prediction method as described in any one of the above embodiments.

In an operation S620, the current block may be coded based on the sub-block motion prediction result of the current block.

In the coding method provided by the present embodiment, the sub-block motion prediction result may be obtained by performing the sub-block motion prediction method as described in any one of the above embodiments. In this way, prediction precision may be improved, coding precision may be improved, a spatial redundancy may further be eliminated easily, and the compression rate of inter-frame coding may be improved.

Figure 7:
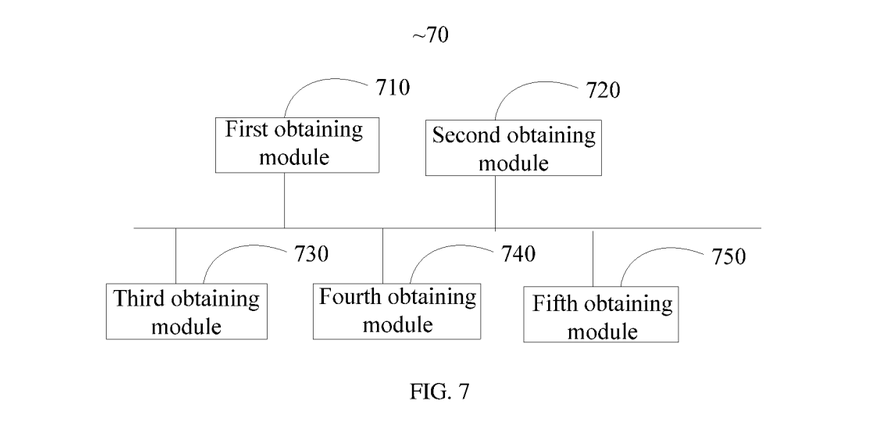
FIG. 7 is a structural schematic view of an apparatus for sub-block motion prediction according to an embodiment of the present disclosure.

As shown in FIG. 7, a structural schematic view of an apparatus for sub-block motion prediction according to an embodiment of the present disclosure is provided. In the present embodiment, a sub-block motion prediction apparatus 70 may include a first obtaining module 710, a second obtaining module 720, a third obtaining module 730, a fourth obtaining module 740, and a fifth obtaining module 750.

The first obtaining module 710 may be configured to obtain the reference block, the co-located frame, and the reference frame of the current block. At least one of the number of reference blocks, the number of co-located frames, and the number of reference frames is greater than one. The reference block may be a coding block of the current frame.

The second obtaining module 720 may be configured to obtain the motion vector of the current block. The number of motion vectors may be greater than or equal to 1. The motion vector of each current block may correspond to a set of reference parameters. Each set of reference parameters may include the reference motion vector, the co-located frame, and the reference frame, which are obtained based on the motion vector of the reference block.

The third obtaining module 730 may be configured to obtain the co-located block of each of the plurality of sub-blocks based on each set of reference parameters. The plurality of sub-blocks are obtained by dividing the current block. The co-located block of each of the plurality of sub-blocks may be the block at which the first offset point of the co-located frame is located, and the first offset point may be the point formed by the specified point of each of the plurality of sub-blocks being offset for the motion vector.

The fourth obtaining module 740 may be configured to obtain the candidate motion vector of each of the plurality of sub-blocks based on the co-located block of each of the plurality of sub-blocks.

The fifth obtaining module 750 may be configured to obtain the sub-block motion prediction result of the current block based on all candidate motion vectors of the plurality of sub-blocks and following the principle of consuming the minimal prediction cost.

According to the sub-block motion prediction apparatus provided by the present disclosure, at least one of the number of reference blocks, the number of co-located frames, and the number of reference frames is greater than 1. In this way, an increased number of sub-block candidate motion vectors may be obtained, precision of selecting the final motion vector may be improved, accuracy of prediction may be improved, the temporal redundancy may further be eliminated, and the compression rate of inter-frame coding may be improved.

Figure 8:
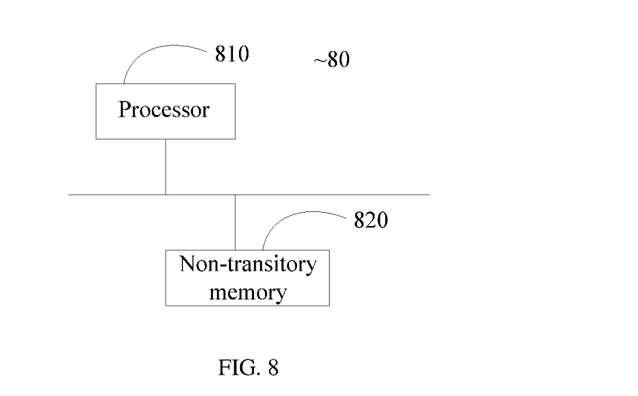
FIG. 8 is a structural schematic view of an encoder according to an embodiment of the present disclosure.

As shown in FIG. 8, a structural schematic view of an encoder according to an embodiment of the present disclosure is provided. In the present embodiment, the encoder 80 may include a processor 810 and a non-transitory memory 820. The processor 810 may be coupled to the non-transitory memory 820. The non-transitory memory 820 may be configured to store programs. The processor 810 may be configured to execute the programs to perform the sub-block motion prediction method and the coding method as described in the above embodiments.

The processor 810 may be referred as a central processing unit (CPU). The processor 810 may be an integrated circuit chip, capable of processing signals. The processor 810 may be a general-purpose processor, a digital signal processor (DSP), an application specific integrated circuit (ASIC), a field programmable gate array (FPGA) or other programmable logic components, a discrete or transistor logic component, or a discrete hardware assembly. The general-purpose processor may be a microprocessor. Alternatively, the processor may be any conventional processor.

Figure 9:
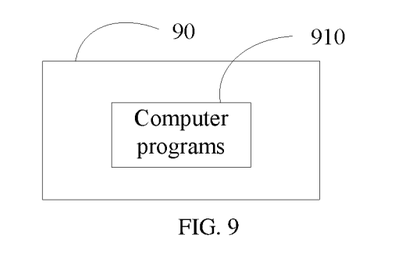
FIG. 9 is a structural schematic view of an apparatus for storage according to an embodiment of the present disclosure.

As shown in FIG. 9, a structural schematic view of an apparatus for storage according to an embodiment of the present disclosure is provided. In the present embodiment, the apparatus 90 for storage may store a program 910. The program 910 may be executed to achieve the sub-block motion prediction method and the coding method as described in the above embodiments.

The program 910 may be in a form of software stored in the above-mentioned apparatus 90 for storage. The program 910 may include a plurality of instructions configured to enable a device or a process to execute all or some of the operations of the methods as described in various embodiments of the present disclosure.

The apparatus 90 for storage may be a medium for storing certain types of discrete physical quantities. The above-mentioned apparatus 90 for storage may be a medium able to store program codes and may include: a universal serial bus (USB) disc, a portable hard drive, a read-only memory, a random access memory, a magnetic disc, or an optical disc.

In various embodiments of the present disclosure, it should be understood that, the disclosed system, apparatus, and method may be achieved by other means. For example, the embodiment of the above-mentioned apparatus may be exemplary only. For example, the modules or units may be divided based on logic functions only. Practically, the modules and the units can be divided by other means. For example, a plurality of units or assemblies may be combined or integrated into another system. Alternatively, some features may be omitted or not performed. Further, coupling, direct coupling, or communicative connection between the components as shown or discussed in the above may be achieved via some interfaces. Indirect coupling or communicative connection between the apparatus and the units may be electrical, mechanical, or in other forms.

The units illustrated as an independent component may be or may not be physically independent. A component shown as a unit may be or may not be a physical unit. That is, the unit may be arranged at one location, or distributed into various network units. Some or all of the units may be arranged based on actual needs to achieve the objective of the present disclosure.

Further, various functional units in various implementations of the present disclosure may be integrated into one processing unit. Alternatively, the various functional units may be physically arranged independent from each other. Alternatively, two or more units may be integrated into one unit. The integrated unit may be achieved in a form of hardware or in a form of a software functional unit.

When the integrated unit is achieved in the form of the software functional unit and sold or used as an independent product, the integrated unit may be stored in a computer-readable non-transitory storage medium. In this way, an essence of the technical solution of the present disclosure, i.e., a portion of the present technical solution contributing to the art, or the entire technical solution, may be achieved in the form of a software product. The computer software product may be stored in a non-transitory memory and may include a plurality of instructions. The plurality of instructions may be configured to enable the computer device (such as a personal computer, a server, or a network device) or the processor to execute all or some of the operations of the methods as described in the above embodiments.

The above are only implementations of the present disclosure, but the protection scope of the present disclosure is not limited thereto. Any equivalent structural or process transformation obtained based on the specification and the drawings of the present disclosure, applied directly or indirectly in other related art, should be included within the scope of the present disclosure.

What is claimed is:

1. A sub-block motion prediction method, comprising:
   obtaining one or more motion vectors of a current block, wherein each of the one or more motion vectors corresponds to a set of reference parameters, the set of reference parameters comprises a co-located frame of the current block and a reference motion vector obtained from a motion vector of a reference block of the current block;
   obtaining a co-located block of each of a plurality of sub-blocks based on the set of reference parameters, wherein the co-located block of each of the plurality of sub-blocks is a block at which a first offset point of the co-located frame is located, the first offset point is a point formed by a specified point of each of the plurality of sub-blocks being offset for the reference motion vector; and
   obtaining a candidate motion vector of each of the plurality of sub-blocks based on a motion vector of the co-located block of each of the plurality of sub-blocks, and obtaining a sub-block motion prediction result of the current block based on all candidate motion vectors of all of the plurality of sub-blocks;
   wherein before the obtaining the co-located block of each of the plurality of sub-blocks based on the set of reference parameters, the method further comprises:
   determining a size of each of the plurality of sub-blocks based on a comparison result of an amplitude value of the motion vector of the current block to a predefined threshold; and
   dividing the current block based on the size of each of the plurality of sub-blocks.

2. The sub-block motion prediction method according to claim 1, wherein
   when the amplitude value of the motion vector of the current block is less than the predefined threshold, a width of each of the plurality of sub-blocks is a lower value selected from a first predefined value and a width of the current block, and a height of each of the plurality of sub-blocks is a lower value selected from a second predefined value and a height of the current block;
   when the amplitude value of the motion vector of the current block is greater than or equal to the predefined threshold, the width of each of the plurality of sub-blocks is a lower value selected from a third predefined value and the width of the current block, and the height of each of the plurality of sub-blocks is a lower value selected from a fourth predefined value and the height of the current block.

3. The sub-block motion prediction method according to claim 1, wherein the obtaining the one or more motion vectors of the current block comprises:
   obtaining a reference motion vector of the current block based on a motion vector of the reference block of the current block;
   obtaining a block, where a second offset point is located, from the co-located frame, and taking the block, where the second offset point is located, as the co-located block of the current block, wherein the second offset point is a point formed by a specified point of the current block being offset for the reference motion vector; and
   scaling a motion vector of the co-located block of the current block to obtain the motion vector of the current block, when a prediction mode applied by the co-located block of the current block is the same as a prediction mode applied by the current block.

4. The sub-block motion prediction method according to claim 3, wherein the obtaining the reference motion vector of the current block based on the motion vector of the reference block of the current block, comprises:
   taking the motion vector of the reference block of the current block as a reference motion vector of each of the plurality of sub-blocks, when a prediction mode applied by the reference block of the current block is the same as the prediction mode applied by the current block; and
   recording the reference motion vector of the current block as 0, when the prediction mode applied by the reference block of the current block is different from the prediction mode applied by the current block.

5. The sub-block motion prediction method according to claim 1, wherein the obtaining the candidate motion vector of each of the plurality of sub-blocks based on the motion vector of the co-located block of each of the plurality of sub-blocks, comprises:
  scaling the motion vector of the co-located of each of the plurality of sub-blocks to obtain the candidate motion vector of each of the plurality of sub-blocks, when a prediction mode applied by the co-located block of each of the plurality of sub-blocks is the same as a prediction mode of the current block; and
  taking the motion vector of the current block as the candidate motion vector of each of the plurality of sub-blocks, when the prediction mode applied by the co-located block of each of the plurality of sub-blocks is different from the prediction mode of the current block.

6. The sub-block motion prediction method according to claim 1, wherein the obtaining the sub-block motion prediction result of the current block based on all candidate motion vectors of all of the plurality of sub-blocks, comprises:
  calculating prediction values of all candidate motion vectors of all of the plurality of sub-blocks;
  obtaining a prediction block of the current block, wherein the number of prediction blocks is one or more, each of the one or more prediction blocks consists of the prediction values of all of the plurality of sub-blocks, the prediction values are obtained by performing prediction based on all candidate motion vectors of all of the plurality of sub-blocks, and all candidate motion vectors of all of the plurality of sub-blocks are obtained based on a same set of reference parameters;
  calculating a prediction cost of each of the one or more prediction blocks; and
  selecting a prediction block having the minimal prediction cost, wherein a reference parameter corresponding to the prediction block having the minimal prediction cost is taken as the sub-block motion prediction result of the current block.

7. The sub-block motion prediction method according to claim 6, wherein the calculating prediction values of all candidate motion vectors of all of the plurality of sub-blocks comprises:
  calculating one prediction value for a plurality of consecutive sub-blocks having a same candidate motion vector.

8. The sub-block motion prediction method according to claim 6, further comprising:
  coding the current block to obtain a stream of the current block based on final motion vectors of all of the plurality of sub-blocks, wherein the stream of the current block comprises a sub-block motion syntax element, and the sub-block motion syntax element is configured to indicate whether to perform the sub-block motion prediction method for coding.

9. The sub-block motion prediction method according to claim 8, wherein
  the stream of the current block further comprises at least one of: a reference block syntax element, a co-located frame index syntax element, and a reference frame index syntax element;
  the reference block syntax element configured to indicate a location of a reference block corresponding to the sub-block motion prediction result of the current block;
  the co-located frame index syntax element is configured to indicate an index of a co-located frame, which corresponds to the sub-block motion prediction result of the current block, in a reference frame list; and
  the reference frame index syntax element is configured to indicate an index of a reference frame, which corresponds to the sub-block motion prediction result of the current block, in a reference frame list.

10. The sub-block motion prediction method according to claim 1, wherein the obtaining the sub-block motion prediction result of the current block based on all candidate motion vectors of all of the plurality of sub-blocks, comprises:
  calculating prediction costs of all candidate motion vectors of all of the plurality of sub-blocks; and
  selecting a candidate motion vector having the minimal prediction cost for each of the plurality of sub-blocks, taking the selected candidate motion vector as a final motion vector for each of the plurality of sub-blocks, and taking all final candidate motion vectors of all the plurality of sub-blocks as the sub-block motion prediction result of the current block.

11. A coding method, comprising:
  obtaining one or more motion vectors of a current block, wherein each of the one or more motion vectors corresponds to a set of reference parameters, the set of reference parameters comprises a co-located frame of the current block and a reference motion vector obtained from a motion vector of a reference block of the current block;
  obtaining a co-located block of each of a plurality of sub-blocks based on the set of reference parameters, wherein the co-located block of each of the plurality of sub-blocks is a block at which a first offset point of the co-located frame is located, the first offset point is a point formed by a specified point of each of the plurality of sub-blocks being offset for the reference motion vector; and
  obtaining a candidate motion vector of each of the plurality of sub-blocks based on a motion vector of the co-located block of each of the plurality of sub-blocks, and obtaining a sub-block motion prediction result of the current block based on all candidate motion vectors of all of the plurality of sub-blocks; and
  coding the current block based on the sub-block motion prediction result of the current block;
  wherein before the obtaining the co-located block of each of the plurality of sub-blocks based on the set of reference parameters, the method further comprises:
  determining a size of each of the plurality of sub-blocks based on a comparison result of an amplitude value of the motion vector of the current block to a predefined threshold; and
  dividing the current block based on the size of each of the plurality of sub-blocks.

12. The coding method according to claim 11, wherein
  when the amplitude value of the motion vector of the current block is less than the predefined threshold, a width of each of the plurality of sub-blocks is a lower value selected from a first predefined value and a width of the current block, and a height of each of the plurality of sub-blocks is a lower value selected from a second predefined value and a height of the current block;
  when the amplitude value of the motion vector of the current block is greater than or equal to the predefined threshold, the width of each of the plurality of sub-blocks is a lower value selected from a third predefined value and the width of the current block, and the height of each of the plurality of sub-blocks is a lower value selected from a fourth predefined value and the height of the current block.

13. The coding method according to claim 11, wherein the obtaining one or more motion vectors of the current block comprises:
  obtaining a reference motion vector of the current block based on a motion vector of the reference block of the current block;
  obtaining a block, where a second offset point is located, from the co-located frame, and taking the block, where the second offset point is located, as the co-located block of the current block, wherein the second offset point is a point formed by a specified point of the current block being offset for the reference motion vector; and
  scaling a motion vector of the co-located block of the current block to obtain the motion vector of the current block, when a prediction mode applied by the co-located block of the current block is the same as a prediction mode applied by the current block.

14. The coding method according to claim 13, wherein the obtaining the reference motion vector of the current block based on the motion vector of the reference block of the current block, comprises:
  taking the motion vector of the reference block of the current block as a reference motion vector of each of the plurality of sub-blocks, when a prediction mode applied by the reference block of the current block is the same as the prediction mode applied by the current block; and
  recording the reference motion vector of the current block as 0, when the prediction mode applied by the reference block of the current block is different from the prediction mode applied by the current block.

15. The coding method according to claim 11, wherein the obtaining the candidate motion vector of each of the plurality of sub-blocks based on the motion vector of the co-located block of each of the plurality of sub-blocks, comprises:
  scaling the motion vector of the co-located of each of the plurality of sub-blocks to obtain the candidate motion vector of each of the plurality of sub-blocks, when a prediction mode applied by the co-located block of each of the plurality of sub-blocks is the same as a prediction mode of the current block; and
  taking the motion vector of the current block as the candidate motion vector of each of the plurality of sub-blocks, when the prediction mode applied by the co-located block of each of the plurality of sub-blocks is different from the prediction mode of the current block.

16. The coding method according to claim 11, wherein the obtaining the sub-block motion prediction result of the current block based on all candidate motion vectors of all of the plurality of sub-blocks, comprises:
  calculating prediction values of all candidate motion vectors of all of the plurality of sub-blocks;
  obtaining a prediction block of the current block, wherein the number of prediction blocks is one or more, each of the one or more prediction blocks consists of the prediction values of all of the plurality of sub-blocks, the prediction values are obtained by performing prediction based on all candidate motion vectors of all of the plurality of sub-blocks, and all candidate motion vectors of all of the plurality of sub-blocks are obtained based on a same set of reference parameters;
  calculating a prediction cost of each of the one or more prediction blocks; and
  selecting a prediction block having the minimal prediction cost, wherein a reference parameter corresponding to the prediction block having the minimal prediction cost is taken as the sub-block motion prediction result of the current block.

17. The coding method according to claim 16, wherein the calculating prediction values of all candidate motion vectors of all of the plurality of sub-blocks comprises:
  calculating one prediction value for a plurality of consecutive sub-blocks having a same candidate motion vector.

18. A sub-block motion prediction apparatus, comprising:
  a first obtaining module, configured to obtain one or more motion vectors of a current block, wherein each of the one or more motion vectors corresponds to a set of reference parameters, the set of reference parameters comprises a co-located frame of the current block and a reference motion vector obtained from a motion vector of a reference block of the current block;
  a second obtaining module, configured to obtain a co-located block of each of a plurality of sub-blocks based on the set of reference parameters, wherein the co-located block of each of the plurality of sub-blocks is a block at which a first offset point of the co-located frame is located, the first offset point is a point formed by a specified point of each of the plurality of sub-blocks being offset for the reference motion vector;
  a third obtaining module, configured to obtain a candidate motion vector of each of the plurality of sub-blocks based on a motion vector of the co-located block of the plurality of sub-blocks; and
  a fifth obtaining module, configured to obtain a sub-block motion prediction result of the current block based on all candidate motion vectors of all of the plurality of sub-blocks;
  wherein before the obtaining the co-located block of each of the plurality of sub-blocks based on the set of reference parameters, the sub-block motion prediction apparatus is further configured to:
  determine a size of each of the plurality of sub-blocks based on a comparison result of an amplitude value of the motion vector of the current block to a predefined threshold; and
  divide the current block based on the size of each of the plurality of sub-blocks.

* * * * *